(12) United States Patent
Schneider et al.

(10) Patent No.: US 7,568,391 B2
(45) Date of Patent: *Aug. 4, 2009

(54) ULTRASONIC IMAGING SCANNER

(75) Inventors: John K. Schneider, Snyder, NY (US);
Jack C. Kitchens, Tonawanda, NY (US); Stephen M. Gojevic, Buffalo, NY (US); Igor Shmelkin, East Amherst, NY (US)

(73) Assignee: Ultra-Scan Corporation, Amherst, NY (US)

( * ) Notice: Subject to any disclaimer, the term of this patent is extended or adjusted under 35 U.S.C. 154(b) by 502 days.

This patent is subject to a terminal disclaimer.

(21) Appl. No.: 11/059,801

(22) Filed: Feb. 17, 2005

(65) Prior Publication Data

US 2005/0196022 A1 Sep. 8, 2005

Related U.S. Application Data

(60) Provisional application No. 60/545,245, filed on Feb. 17, 2004.

(51) Int. Cl.
*G01N 9/24* (2006.01)
*G06K 9/00* (2006.01)

(52) U.S. Cl. .............................. 73/620; 73/621; 73/622; 382/124

(58) Field of Classification Search .................. 73/620, 73/621, 622; 382/124, 125, 126, 127; 600/445, 600/459
See application file for complete search history.

(56) References Cited

U.S. PATENT DOCUMENTS

| 5,647,364 | A  | * | 7/1997  | Schneider et al. | 600/445 |
| 5,935,071 | A  | * | 8/1999  | Schneider et al. | 600/445 |
| 6,181,807 | B1 | * | 1/2001  | Setlak et al.    | 382/124 |
| 6,296,610 | B1 | * | 10/2001 | Schneider et al. | 600/445 |
| 6,914,517 | B2 | * | 7/2005  | Kinsella         | 340/5.83 |
| 2005/0054926 | A1 | * | 3/2005 | Lincoln         | 600/443 |
| 2005/0117786 | A1 | * | 6/2005 | Schneider et al. | 382/124 |
| 2005/0196022 | A1 | * | 9/2005 | Schneider et al. | 382/124 |
| 2006/0013453 | A1 | * | 1/2006 | Schneider et al. | 382/124 |

OTHER PUBLICATIONS

International Search Report for PCT/US2005/05030, Sep. 26, 2007, Ultra-Scan Corporation.
Written Opinion for PCT/US2005/05030, Sep. 26, 2007, Ultra-Scan Corporation.

* cited by examiner

*Primary Examiner*—Hezron Williams
*Assistant Examiner*—J M Saint Surin
(74) *Attorney, Agent, or Firm*—Hodgson Russ LLP (57) ABSTRACT

The invention includes a system and a method of scanning fingerprints. A system may include an imaging surface, an ultrasound transducer, a probe arm joined to the transducer, a driver capable of moving the pivot location linearly and the transducer arcuately, a measurer capable of measuring a linear position of the pivot-location and an arcuate position of the transducer, and a coupler capable of coupling information corresponding to the linear position and the arcuate position with information from the transducer.

28 Claims, 6 Drawing Sheets

ULTRASONIC IMAGING SCANNER

CROSS-REFERENCE TO RELATED APPLICATION

This application claims the benefit of priority to U.S. provisional patent application Ser. No. 60/545,245, filed on Feb. 17, 2004.

FIELD OF THE INVENTION

The present invention relates to ultrasonic fingerprint scanning systems and methods.

BACKGROUND OF THE INVENTION

The invention may be used to obtain information related to the friction-ridge-detail of a finger, or more than one finger. The friction-ridge-detail information may be used to provide an image of the friction-ridge-detail, also referred to herein as the finger print.

SUMMARY OF THE INVENTION

The present invention may be embodied as a fingerprint scanning system having an imaging surface that is capable of receiving a finger, and an ultrasound transducer capable of providing information corresponding to a fingerprint of the finger. The system may include a probe arm joined to the transducer, a crank arm pivotally connected to the probe arm, a flywheel pivotally connected to the crank arm, and a flywheel driver capable of rotating the flywheel in order to cause the transducer to move along an arcuate path. The arcuate path may be defined by a set of points that are equidistant from a pivot-location of the probe arm.

The system may further include a linear driver capable of moving the pivot location linearly, and a measurer. The measurer may be capable of measuring a linear position of the pivot-location and an arcuate position of the transducer. A coupler may be employed in the system to couple the linear position of the pivot-location and the arcuate position of the transducer with information from the transducer. The information from the transducer may be the time that an ultrasonic signal was sent from the transducer, and the time that a reflected ultrasonic signal was received at the transducer. The information from the transducer may be the change in time between sending the ultrasonic signal and receiving the reflected signal.

A fingerprint scanning system according to the invention may include an imaging surface capable of receiving a finger, an ultrasound transducer capable of providing information corresponding to a fingerprint of the finger, and a probe arm joined to the transducer. The probe arm may have a pivot location. The system may have a linear driver capable of moving the pivot location linearly, and an arcuate driver capable of moving the transducer arcuately. The system may include a measurer capable of measuring a linear position of the pivot location, and an arcuate position of the transducer. The system may also include a coupler capable of coupling the linear position of the pivot location, the arcuate position of the transducer, and the information from the transducer.

The invention may be embodied as a method of scanning a fingerprint in which a finger is received on an imaging surface. An ultrasonic transducer may be provided and joined to a probe arm which is pivotable about a pivot-location. A crank arm may be provided and pivotally connected to the probe arm. A flywheel may be provided and pivotally connected to the crank arm. A flywheel-driver may be provided which is capable of rotating the flywheel in order to cause the transducer to move along an arcuate path. A linear position of the pivot location may be recorded to provide a linear recording, and an arcuate position of the ultrasonic transducer may be recorded to provide an arcuate recording. An ultrasonic signal may be sent from the ultrasonic transducer toward the finger, and a reflected ultrasonic signal may be received at the ultrasonic transducer. Information about the ultrasonic signals may be recorded, such as the change in time between sending the ultrasonic signal toward the finger and receiving the reflected ultrasonic signal. The recorded signal information may be coupled with the linear recording and the arcuate recording to provide a set of information. The flywheel may be rotated in order to move the transducer to a new arcuate position, and another set of information may be provided. Once a desired number of such sets are provided, the linear position of the pivot-location may be changed, and then sets of information corresponding to the new linear position may be provided. The sets of information may be used to create an image of the fingerprint corresponding to the finger on the imaging surface.

A method according the invention may provide (a) an ultrasound transducer capable of providing information corresponding to a fingerprint of the finger, (b) a linear driver capable of moving the pivot location linearly, and (c) an arcuate driver capable of moving the transducer arcuately. Then the linear driver may move the pivot location to a desired linear position. A first set of fingerprint information may be generated using the transducer at the linear position and the arcuate position, and then the transducer may be moved arcuately to a second arcuate position using the arcuate driver. Then a second set of fingerprint information may be generated at the linear position and the second arcuate position.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
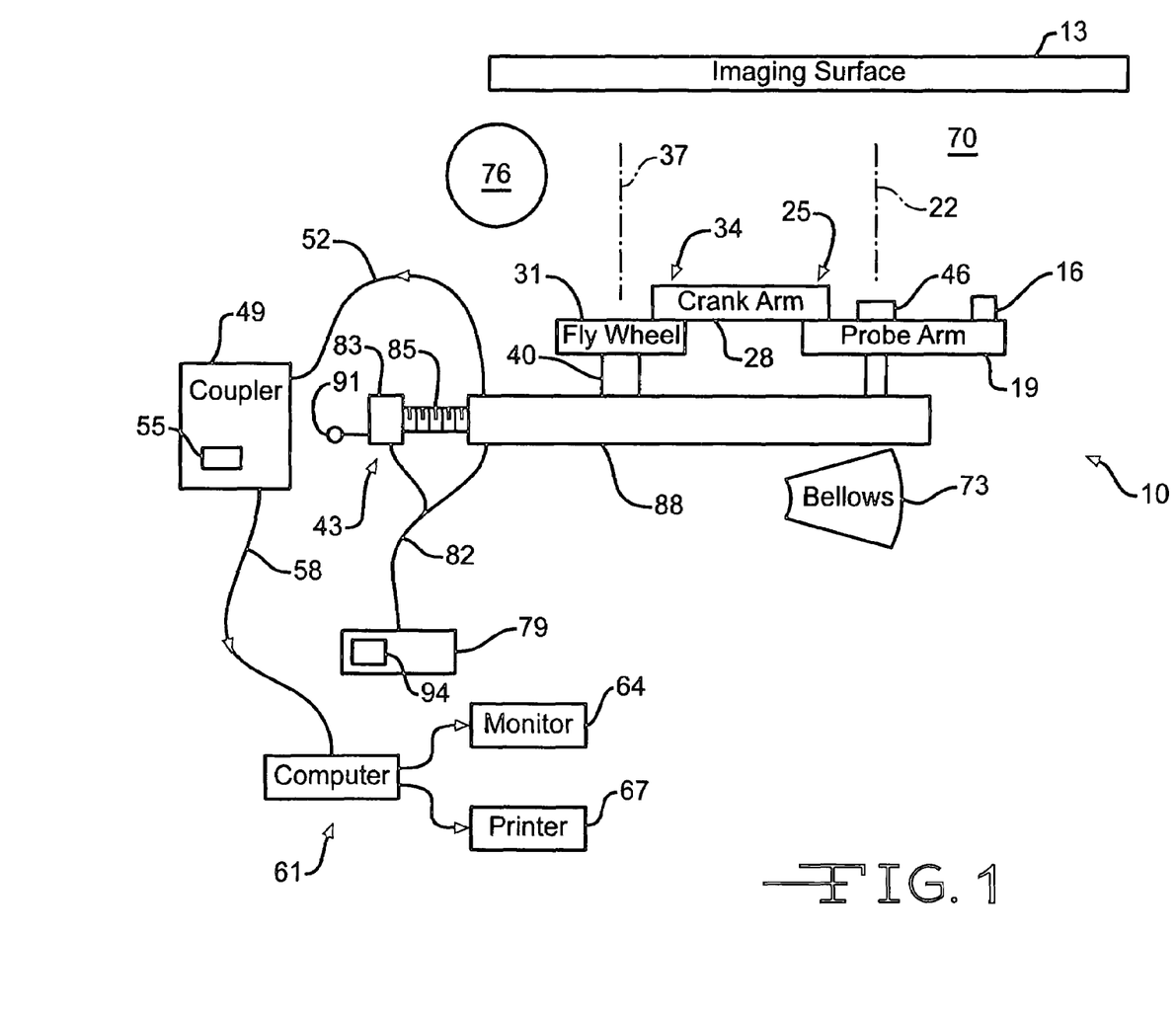
FIG. 1, which is a schematic showing features of a system according to the invention.

FIG. 1 depicts an embodiment of the fingerprint scanning system. The scanning system 10 may include an imaging surface 13 capable of receiving a finger. The imaging surface 13 may be a polished substantially planar synthetic resin. The scanning system 10 may also include an ultrasound transducer 16 capable of providing information corresponding to a fingerprint of the finger. A probe arm 19 may be included, and joined to the transducer 16. The probe arm 19 may be pivotable about a pivot-location 22.

Figure 2:
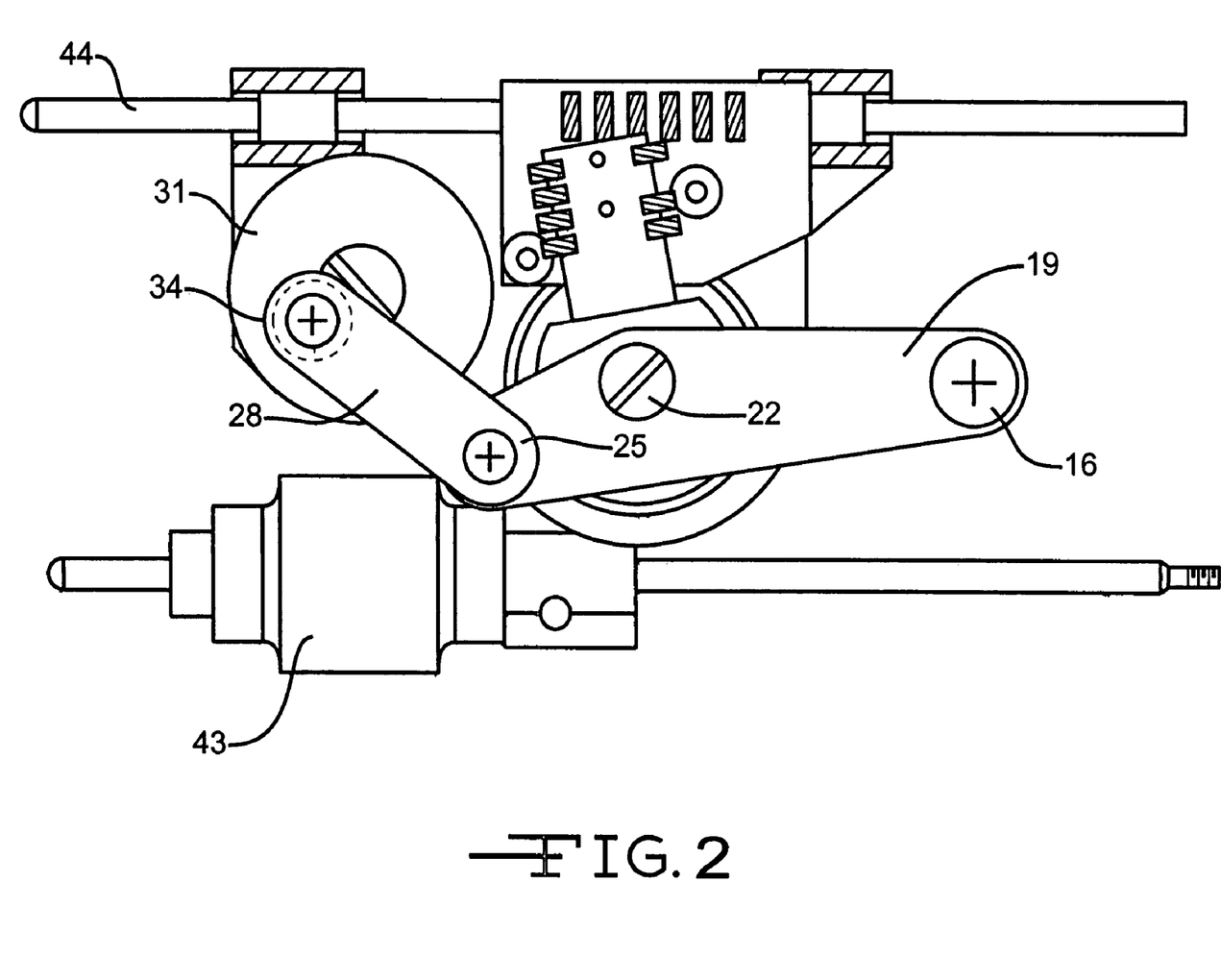
FIG. 2, which is a plan view of some of the features depicted in FIG. 1.
Figure 3:
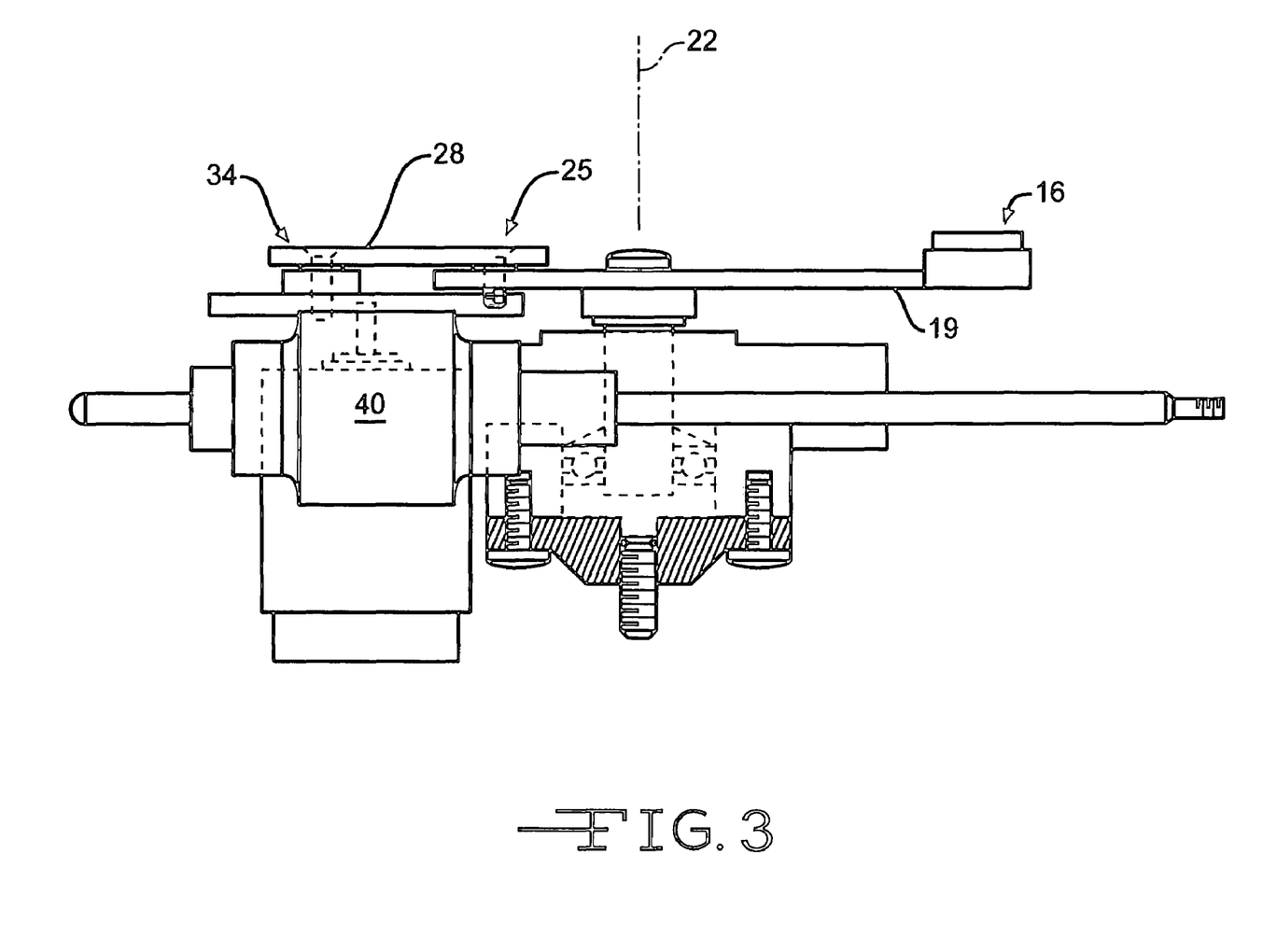
FIG. 3, which is a side view of the features depicted in FIG. 2.

FIGS. 2 and 3 provide additional detail about a system 10 according to the invention. The probe arm 19 may be pivotally connected to a first end 25 of a crank arm 28. The location at which the probe arm 19 is pivotally connected to the first end 25 is not coincident with the pivot-location 22.

A flywheel 31 may be pivotally connected to a second end 34 of the crank arm 28. The location at which the flywheel 31 and the second end 34 are connected is not coincident with the flywheel's center of rotation 37.

A flywheel driver 40 may be provided, which is capable of rotating the flywheel 31. The probe arm 19, crank arm 28, flywheel 31 and flywheel driver 40 may be considered an example of an arcuate driver, capable of causing the transducer 16 to move along an arcuate path. As the flywheel 31 rotates, the second end 34 of the crank arm 28 moves in a circular fashion and drives the first end 25 of the crank arm 28 along an arcuate path. As a result, the transducer 16 is moved along an arcuate path. The transducer's arcuate path is equidistant from the pivot-location 22.

The system 10 may include a linear driver, such as pivot-location driver 43. The pivot-location driver 43 may be capable of moving the pivot-location 22 along a substantially linear path. By moving the pivot-location 22, the transducer's arcuate path may be changed relative to a finger on the imaging surface 13. One or more linear slides 44 may be used to keep the pivot location 22 aligned along a substantially linear path.

A measurer 46 may be provided, which is capable of measuring a linear position of the pivot-location 22 and an arcuate position of the transducer 16. The measurer 46 may include a rotary optical encoder and code wheel. The measurer 46 may be attached to the flywheel 31 and used to measure the angular position of the flywheel 31. A translation table may be used to correlate every angular position of the flywheel 31 with an arcuate position of the transducer 16. In the embodiment of the invention shown in FIG. 1, the rotary optical encoder and code wheel is attached to the probe arm 16, and the arcuate position of the probe arm 16 is measured directly by the measurer 46.

To measure the linear position of the transducer 16, the measurer 46 may include a programmed microprocessor and associated memory for counting the number of times the pivot-location driver 43 executes a move of a predetermined distance. By knowing the number of moves and the predetermined distance, the position of the pivot-location 22 may be determined.

The measurer 46 and the transducer 16 may be linked to a coupler 49 via a communication channel 52. The coupler 49 may be capable of coupling the linear and arcuate positions with information from the transducer 16. The coupler 49 may include software and a computer memory 55. The memory 55 may be used to store the linear position of the pivot location, the arcuate position of the transducer, and the corresponding information from the transducer 16. The software may be used to cause a computer to store coupling information, which identifies a particular set of information as being related to each other. A set of coupled information may include a linear position, an arcuate position and a piece of transducer information. The piece of transducer information may be the time it took an ultrasound signal to travel from the transducer 16 to the finger and back to the transducer 16.

A communications system 58 may be joined to the memory 55 in order to receive and transmit the stored information. When it is desired to create an image of the scanned fingerprint, the coupled information may be retrieved and sent via the communications system 58 to a computer system 61. From the retrieved set of information, the computer system 61 may be used to determine from the transducer information whether a ridge or a valley of the fingerprint was detected. Using the arcuate position and the linear position information in the retrieved set, the computer system 61 may be used to properly position an indicator corresponding to the transducer information. The indicator may be an illuminated pixel on a monitor 64 of the computer system 61, or the indicator may be a spot of ink printed on a piece of paper by a printer 67 of the computer system 61. By displaying a large number of such indicators, each indicator being representative of a different retrieved set of information, an image of the fingerprint may be provided.

The scanning system 10 may include a fluidic ultrasound transmission medium 70 between the imaging surface 13 and the transducer 16. In one embodiment of the invention, the transducer 16 is immersed in the transmission medium 70. A suitable transmission medium 70 is mineral oil. An elastomeric bellows 73 may also be provided to keep the transmission medium 70 between the transducer 16 and the imaging surface 13 by expanding and contracting as components of the scanning system 10 expand and contract. Such expansion and contraction of the components may be caused by temperature changes. Further, a molecular sieve 76 may be provided to remove unwanted material from the transmission medium 70, such as gas bubbles.

The scanning system 10 may include a control system 79. The control system 79 may control the position of the transducer 16 via a communication link 82. The position of the transducer 16 may be controlled by controlling the linear position of the pivot location 22 and the angular position of the probe arm 19. The angular position of the probe arm 19 may be changed by moving the flywheel 31. The linear position of the pivot location 22 may be changed by the pivot-location driver 43, which may include a stepper motor 83 and a screw 85 to which a carriage 88 is attached. The carriage 88 may support the flywheel 31, crank arm 28 and probe arm 19.

A current detector 91 may be used to provide an indication of the current being delivered to the pivot location driver 43. The current indication may be provided to the control system 79. When the screw 85 has been turned so that the carriage 88 can not move further, the current provided to the pivot location driver 43 will increase as the pivot location driver 43 attempts but fails to move the carriage 88. The current detector 91 and control system 79 will detect that the motor current is above a threshold level. Having determined that the motor current is above the threshold level, the control system 79 will stop the motor from turning the screw in the existing direction. For example, the control system 79 may reverse the direction in which the screw 85 is turned and return the carriage 88 to its resting position in anticipation of imaging another finger.

The control system 79 may include a microprocessor 94 programmed to move the transducer 16, and use the transducer 16 to obtain information about a finger on the imaging surface 13, and thereby coordinate the gathering of transducer position information and fingerprint information needed to create an image of the fingerprint.

When not being used to scan a finger, the transducer 16 may be positioned in a waiting position. For example, the transducer 16 may be positioned to scan the center of the imaging surface 13. While in this position, the ultrasound transducer 16 may periodically send a test signal and receive a reflected signal several times each second. The control system 79 may be programmed to identify when a reflected signal is indicative of a finger residing on the imaging surface 13. To effect such a system, the microprocessor 94 may be programmed to calculate the time between sending the test signal and receiving the reflected signal, and also programmed to compare that calculated time to a predetermined time. If the microprocessor 94 determines that the calculated time is close to the predetermined time, then the microprocessor 94 may initiate a scanning operation to obtain information needed to provide an image of the fingerprint.

Figure 4:
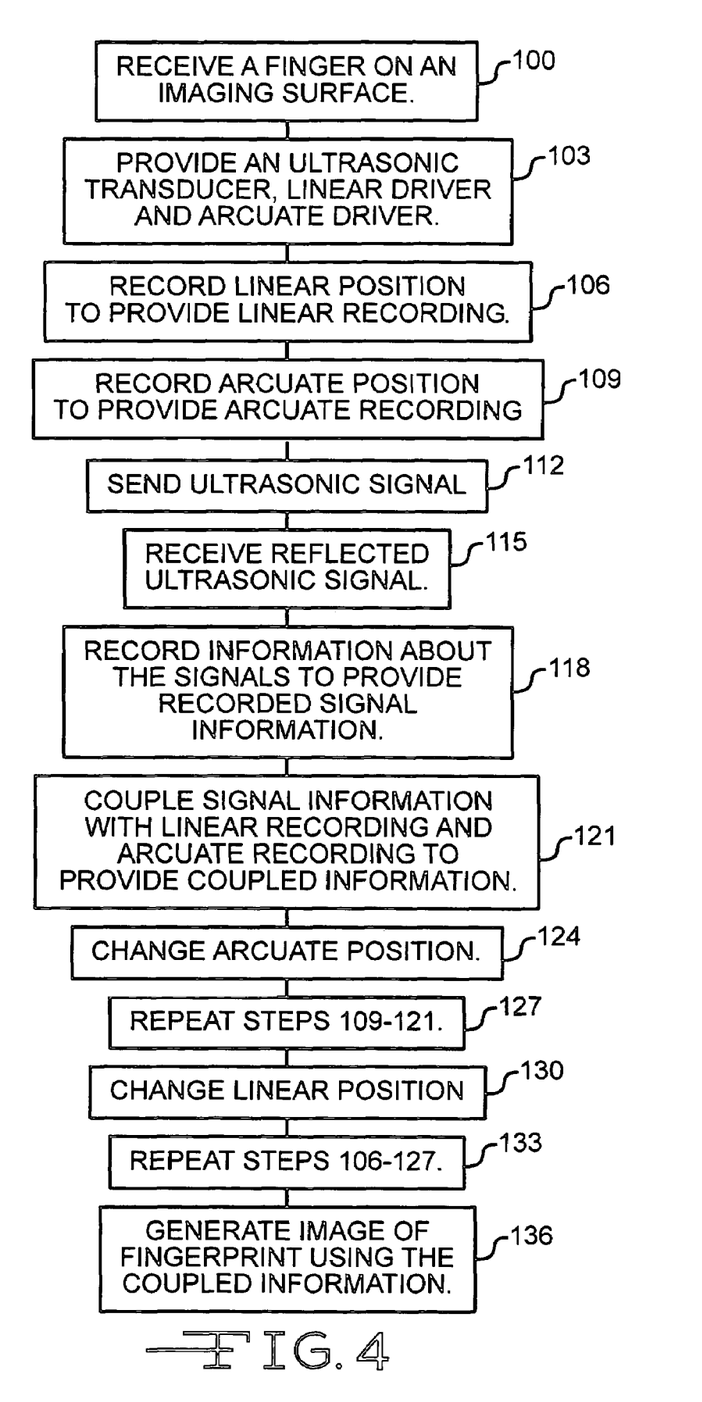
FIG. 4, which is a flow chart of a method according to the invention.

The invention may be embodied as a method of scanning a fingerprint. FIG. 4 depicts one such method in which a finger may be received 100 on an imaging surface. An ultrasonic transducer, linear driver and arcuate driver may be provided 103. The transducer may be capable of providing information corresponding to a fingerprint of the finger. The transducer may be joined to a probe arm, which is pivotable about a pivot-location.

A crank arm may be provided and pivotally connected to the probe arm. A flywheel may be provided and pivotally connected to the crank arm. A flywheel driver may be provided which is capable of rotating the flywheel. When the flywheel is caused to rotate by the flywheel driver, the transducer is caused to move along an arcuate path.

A linear position of the pivot location may be recorded 106, for example in a memory, to provide a linear recording. An arcuate position of the ultrasonic transducer may be recorded 109, for example in a memory, to provide an arcuate recording. An ultrasonic signal may be sent 112 from the ultrasonic transducer toward the finger, and the ultrasonic signal may be reflected from the finger. The reflected signal may be received 115 at the ultrasonic transducer. Information about the reflected signal may be recorded 118, for example in a memory, to provide recorded signal information. The linear recording, arcuate recording and recorded signal information may be coupled 121 so that the coupled information may be recognized as being related to each other.

Next, the arcuate position of the transducer may be changed 124, for example by rotating the flywheel. A new set of coupled information may be created 127, in a manner similar to that described above. After a desired number of coupled information sets have been created, the linear position of the pivot location may be changed 130 by moving the transducer linearly. Then, sets of coupled information corresponding to the new linear position may be created 133. The sets of coupled information may be used to generate 136 an image of the fingerprint.

The signal information may be the change in time between sending the ultrasonic signal and receiving the reflected ultrasonic signal. By knowing the time that lapsed between sending and receiving, it is possible to determine whether a ridge of the fingerprint or a valley of the fingerprint reflected the signal. Ridges in the fingerprint will have a shorter lapsed time than valleys in the fingerprint. By knowing whether a ridge or a valley reflected the signal, and by knowing the position of the transducer, the friction-ridge-detail can be created.

Figure 5:
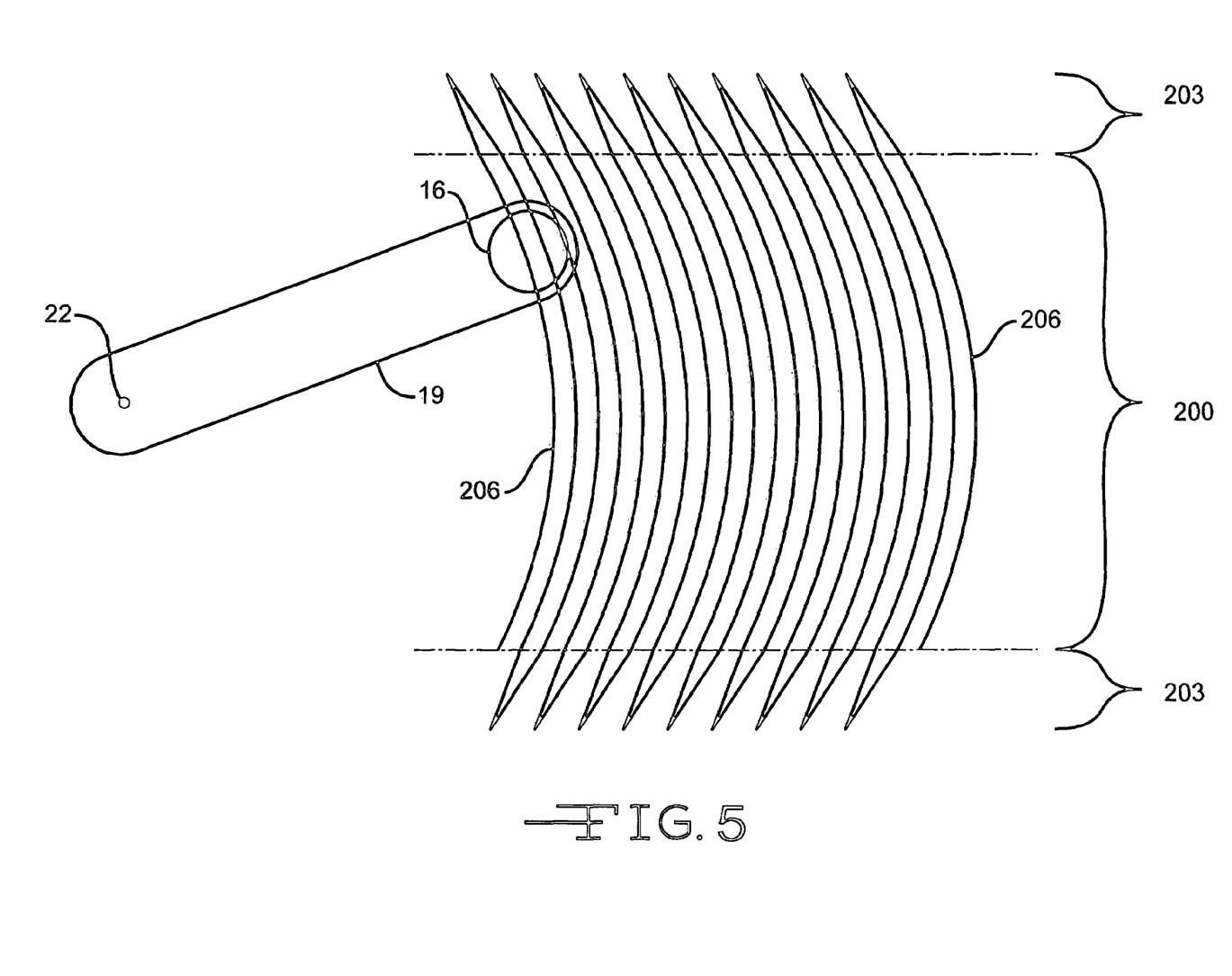
FIG. 5, which is a schematic depicting the motion of the transducer.

FIG. 5. illustrates the path the transducer 16 might take during a scanning operation. During a scanning operation, the transducer may be moved arcuately in a first arcuate direction. When the transducer 16 is in a center sector 200, the transducer 16 may be caused periodically to send and detect ultrasound signals. When the transducer 16 is in one of the edge sectors 203, the pivot location 22 may be moved linearly, and the arcuate direction of the transducer movement may be changed to a second direction. It will be noted that arcuate movement of the transducer 16 may occur in the edge sectors 203. When the transducer 16 is in an edge sector 203, information produced by the transducer 16 may be ignored so that the information produced by the transducer 16 will be distributed along parallel arcuate scan lines 206.

Figure 6:
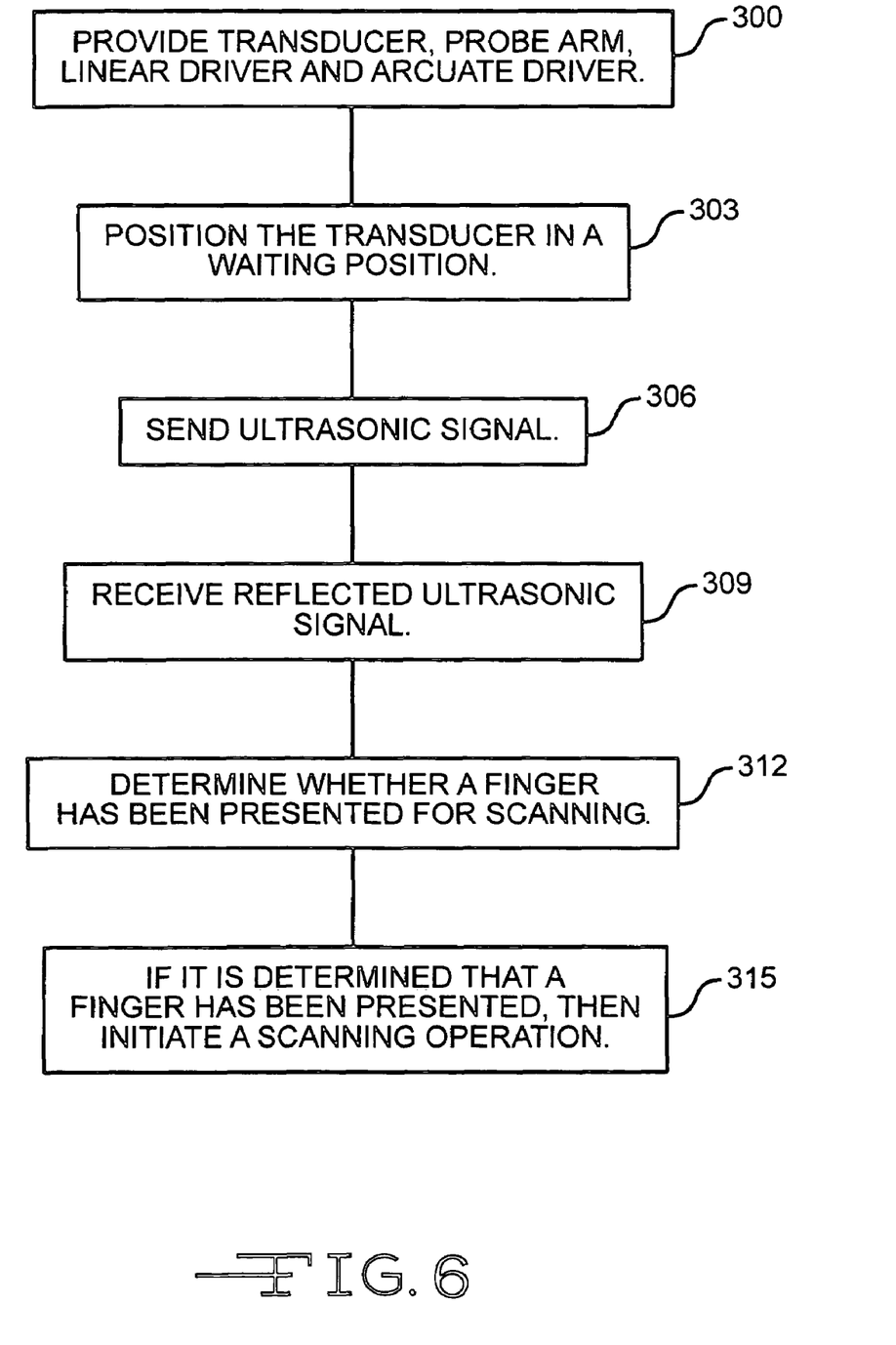
FIG. 6 which is a flow chart of a method for detecting when a finger has been presented for scanning.

FIG. 6 depicts a method which may be used to detect when a finger has been recently placed on an imaging surface, such as the imaging surface 13. Such a method may be used in conjunction with the methods described above. For example, an ultrasonic transducer, probe arm, linear driver and arcuate driver may be provided 300. An ultrasonic transducer may be positioned 303 in a waiting position. For example, the waiting position may be selected so that the transducer may direct ultrasonic signals at a center of the imaging surface. While in the waiting position, the ultrasound transducer may periodically send 306 a test signal and receive 309 a reflected signal. Sending a test signal may occur several times each second. A control system may be programmed to determine 312 whether a finger has been presented for scanning. For example, the control system may calculate the time between sending the test signal and receiving the reflected signal, and also may compare that calculated time to a predetermined time. The predetermined time may be an amount of time expected for an ultrasonic signal to travel from the transducer to a finger on the imaging surface, and back to the transducer. If the calculated time is equal to the predetermined time, or is within an acceptable deviation from the predetermined time, then the control system may initiate 315 a scanning operation to obtain information needed to provide an image of the fingerprint.

Provisional patent application No. 60/545,245 describes embodiments of the invention. That provisional patent application is incorporated by reference.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A fingerprint scanning system comprising:
  an imaging surface capable of receiving a finger;
  an ultrasound transducer capable of providing information corresponding to a fingerprint of the finger;
  a probe arm joined to the transducer, the probe arm having a pivot-location;
  a crank arm pivotally connected to the probe arm;
  a flywheel pivotally connected to the crank arm;
  a flywheel driver capable of rotating the flywheel in order to cause the transducer to move along an arcuate path;
  a linear driver capable of moving the pivot location linearly;
  a measurer capable of measuring linear positions of the pivot-location and arcuate positions of the transducer; and
  a coupler capable of coupling one linear position of the pivot-location and one arcuate position of the transducer with information from the transducer.

2. The apparatus of claim 1 further comprising a fluidic ultrasound transmission medium between the imaging surface and the transducer.

3. The apparatus of claim 2 wherein the fingerprint scanning system further comprises an elastomeric bellows.

4. The apparatus of claim 2 wherein the fingerprint scanning system further comprises a gas scavenging molecular sieve.

5. The apparatus of claim 1 further comprising a control system for controlling the position of the pivot-location.

6. The apparatus of claim 1 further comprising a microprocessor programmed to control the linear position of the pivot-location and the arcuate position of the transducer.

7. The apparatus of claim 1 further comprising a memory for storing information related to the linear position of the pivot-location and the arcuate position of the transducer, and information from the transducer.

8. The apparatus of claim 7 further comprising a communications system for transmitting the information from the memory to a computer system.

9. The apparatus of claim 7 further comprising a communications system and a computer system, wherein the communications system is capable of transmitting the information from the memory to the computer system, and the computer system is capable of displaying an image using the information.

10. The apparatus of claim 1 wherein the imaging surface is made of a polished substantially planar synthetic resin.

11. The apparatus of claim 1 wherein the crank arm and the flywheel are pivotally connected at a location that is not coincident with the flywheel's center of rotation.

12. The apparatus of claim 1 wherein the crank arm and the probe arm are pivotally connected at a location that is not coincident with the pivot-location.

13. The apparatus of claim 1 wherein the probe arm is joined to the transducer at a location that is not coincident with the pivot-location.

14. A fingerprint scanning system comprising:
an imaging surface capable of receiving a finger;
an ultrasound transducer capable of providing information corresponding to a fingerprint of the finger;
a probe arm joined to the transducer, the probe arm having a pivot location;
a linear driver capable of moving the pivot location linearly;
an arcuate driver capable of moving the transducer arcuately;
a measurer capable of measuring a linear position of the pivot-location, and an arcuate position of the transducer; and
a coupler capable of coupling the linear position of the pivot location, the arcuate position of the transducer, and the information from the transducer.

15. The system of claim 14, wherein the linear driver includes a screw and a motor, and the system further includes a carriage supporting the probe arm, the carriage being movable linearly when the motor turns the screw.

16. The system of claim 14, further comprising a current detector capable of sensing an amount of electric current being used by the linear driver, and capable of providing an indication about the current being used.

17. The system of claim 16, further comprising a control system in communication with the current detector, and capable of receiving the indication about the current being used.

18. A method of scanning a fingerprint comprising:
(A) receiving a finger on an imaging surface;
(B) providing (a) an ultrasonic transducer joined to a probe arm which is pivotable about a pivot-location, (b) a crank arm pivotally connected to the probe arm, (c) a flywheel pivotally connected to the crank arm, and (d) a flywheel-driver capable of rotating the flywheel in order to cause the transducer to move along an arcuate path;
(C) recording a linear position of the pivot location to provide a linear recording;
(D) recording an arcuate position of the ultrasonic transducer to provide an arcuate recording;
(E) sending an ultrasonic signal from the ultrasonic transducer toward the finger;
(F) receiving a reflected ultrasonic signal;
(G) recording information about the reflected ultrasonic signal to provide recorded signal information;
(H) coupling the recorded signal information with the linear recording and the arcuate recording;
(I) rotating the flywheel using the flywheel driver;
(J) repeating steps D through H;
(K) moving the pivot-location linearly;
(L) repeating steps C through J.

19. The method of claim 18 further comprising sending the ultrasonic signal through a fluidic ultrasound transmission medium.

20. The method of claim 19 further comprising scavenging gas with a molecular sieve.

21. The method of claim 18 further comprising utilizing a control system to control the position of the pivot-location.

22. The method of claim 18 further comprising utilizing a memory to store information related to the recorded linear position, the recorded arcuate position, and a change in time between sending the ultrasonic signal from the ultrasonic transducer and receiving the reflected ultrasonic signal.

23. The method of claim 22 further comprising transmitting the stored information.

24. The method of claim 23 further comprising using the transmitted information to display an image on a computer system.

25. The method of claim 18 further comprising recording signal information relating to a change in time between sending the ultrasonic signal and receiving the reflected ultrasonic signal.

26. A method of scanning a fingerprint, comprising:
providing (a) an ultrasound transducer capable of providing information corresponding to a fingerprint of the finger, (b) a probe arm attached to the transducer, the probe arm having a pivot location, (c) a linear driver capable of moving the pivot location linearly, the linear driver including a screw, and (c) an arcuate driver capable of moving the transducer arcuately about the pivot location;
turning the screw to move the pivot location to a desired linear position;
generating a first set of fingerprint information using the transducer at the linear position and a first arcuate position;
moving the transducer arcuately to a second arcuate position using the arcuate driver;
generating a second set of fingerprint information using the transducer at the linear position and the second arcuate position;
detecting an amount of current being used by the linear driver, and providing an indication about the current being used;
determining whether the indication exceeds a threshold level;
if the indication exceeds the threshold level, then causing the linear driver to stop attempting to move the pivot location further.

27. A method of scanning a fingerprint, comprising:
providing (a) an ultrasound transducer capable of providing information corresponding to a fingerprint of the finger, (b) a probe arm attached to the transducer, the probe arm having a pivot location, (c) a linear driver capable of moving the pivot location linearly, and (c) an arcuate driver capable of moving the transducer arcuately about the pivot location;
positioning the transducer in a waiting position;
sending an ultrasonic signal;
receiving a reflected ultrasonic signal;

using the reflected ultrasonic signal, determining whether a finger has been presented for scanning to provide a determination signal;

if the determination signal indicates a finger has been presented for scanning, then generating a first set of fingerprint information using the transducer at a first linear position and a first arcuate position;

moving the transducer arcuately to a second arcuate position using the arcuate driver;

generating a second set of fingerprint information using the transducer at the linear position and the second arcuate position.

28. The method of claim 27, wherein determining whether a finger has been presented for scanning includes:

calculating an amount of time between sending the ultrasonic signal and receiving the reflected signal, and comparing the determined amount of time to a predetermined time, the predetermined time being an amount of time expected for an ultrasonic signal to travel from the transducer to a finger, and back to the transducer.

\* \* \* \* \*